May 13, 1952   J. F. NAYLOR   2,596,277
DOUGH MOLDING AND THE LIKE MACHINE
Filed Aug. 8, 1949   3 Sheets-Sheet 1
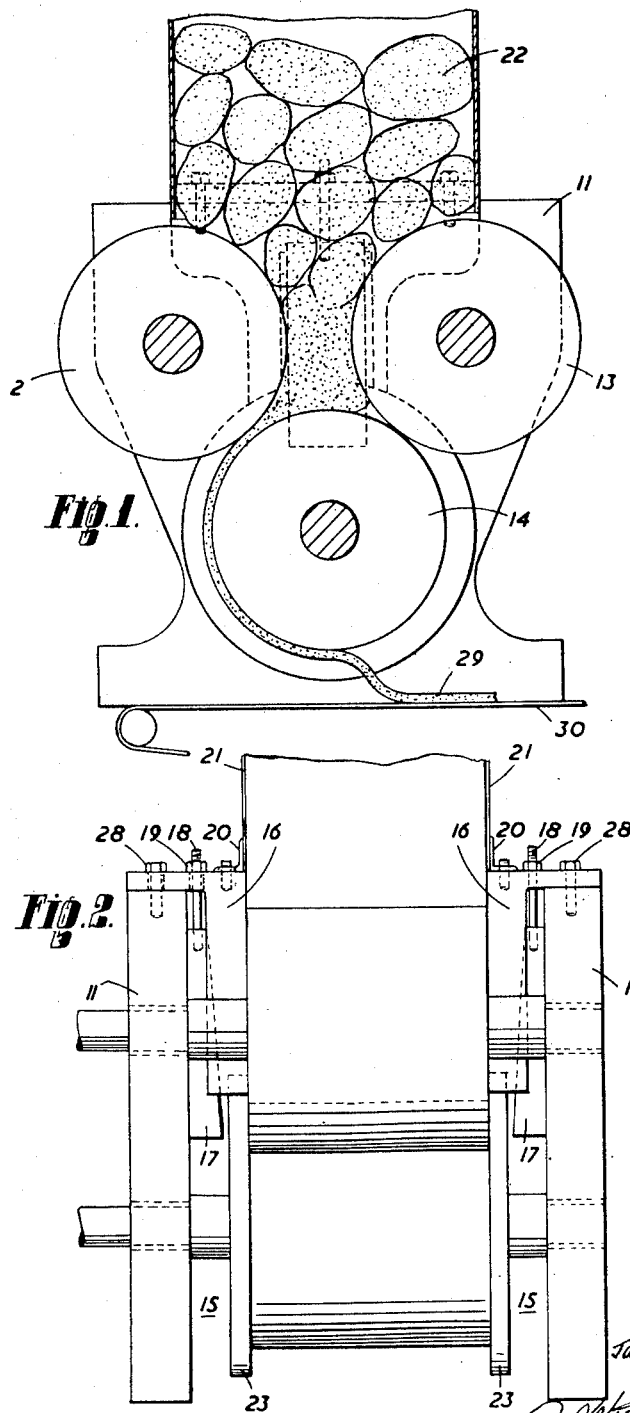
INVENTOR.
JOSEPH FRANCIS NAYLOR
ATTORNEY May 13, 1952  J. F. NAYLOR  2,596,277
DOUGH MOLDING AND THE LIKE MACHINE
Filed Aug. 8, 1949  3 Sheets-Sheet 2
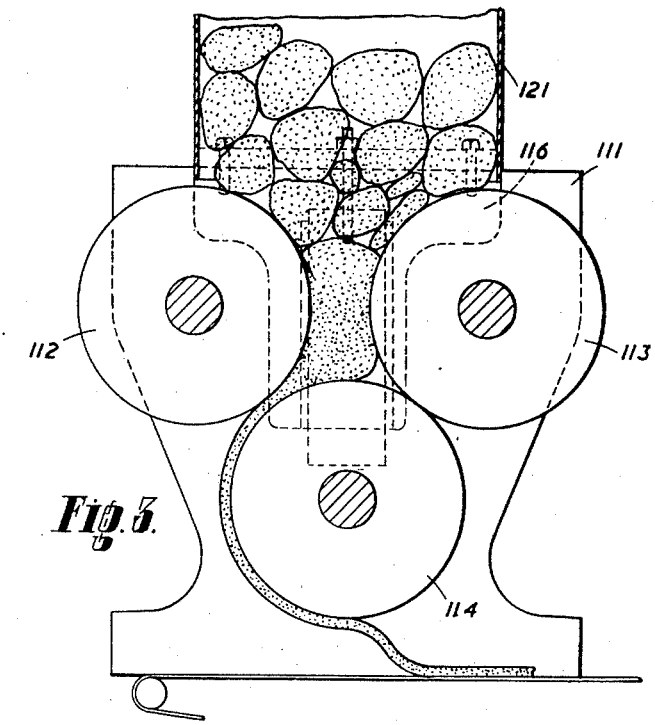
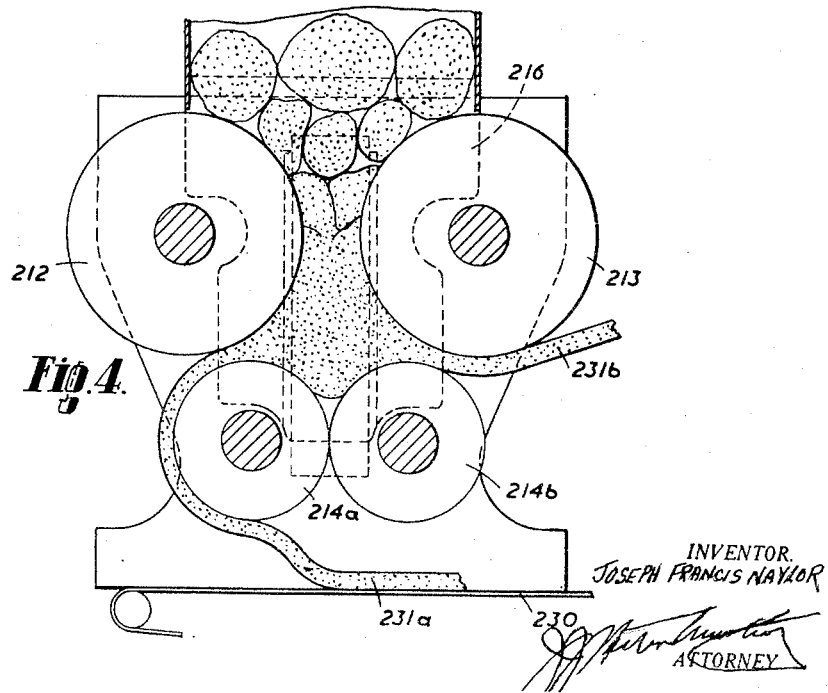
INVENTOR.
JOSEPH FRANCIS NAYLOR
ATTORNEY May 13, 1952  J. F. NAYLOR  2,596,277
DOUGH MOLDING AND THE LIKE MACHINE
Filed Aug. 8, 1949  3 Sheets-Sheet 3
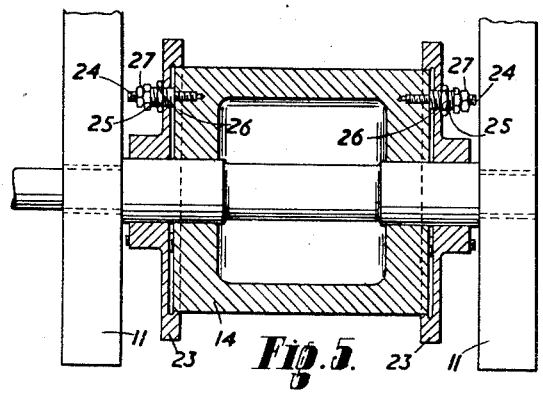
INVENTOR.
JOSEPH FRANCIS NAYLOR
BY
ATTORNEY Patented May 13, 1952

2,596,277

UNITED STATES PATENT OFFICE 2,596,277

DOUGH MOLDING AND THE LIKE MACHINE

Joseph Francis Naylor, Newton-le-Willows, England, assignor to T. & T. Vicars Limited, Newton-le-Willows, England, a British company Application August 8, 1949, Serial No. 109,170
In Great Britain August 31, 1948

4 Claims. (Cl. 107—12)

The present invention concerns improvements in dough moulding or the like machines of the type in which plastic material is received from a hopper and compressed between two or more rollers supported between the side walls of a chamber.

Known machines for the above purpose consist basically of a chamber, the side walls of which support bearings, which in turn support the shafts or rollers between which the dough is rolled or moulded. The end surfaces of the rollers have not previously been protected and a disadvantage of such machines has been that particles of dough have passed into the space between the ends of the rollers and the side walls of the chamber. The result of this penetration of dough particles has been that the rate of wear of the roller ends has been accelerated and when the particles have penetrated even into the bearings, the life and performance of the latter have been seriously affected. In certain cases the seepage of dough or the like particles may cause excessive vibration to be set up in the machine.

It is an object of the present invention to isolate the bearings from the roller ends.

It is also an object of the invention to provide means for such isolation which are also capable of protecting the roller ends.

Yet a further object of the invention is that such means should be adjustable, easily dismantled and easily cleaned.

According to the present invention a dough moulding or rolling machine of the type described has slip plates disposed between the side walls of the chamber and the ends of one or more of the rollers, said slip plates being adjustable in position to a predetermined minimum clearance with the end surfaces of said roller or rollers, or to bear at these ends with predetermined slight pressure. The slip plates are preferably adapted to guard the ends of said roller or rollers at least in the region of their peripheries which at any time are in contact with the dough.

One of a plurality of members each having a wedge surface may conveniently contact a complementary wedge surface provided on each of the slip plates, relative movement being possible between the surfaces to effect an adjustment of said slip plates axially of the roller or rollers.

The slip plates may be in the form of right angular brackets, one arm of which is adjustably secured to the upper part of the machine side walls, while the other arm presents a plain surface adjacent the roller ends. Each member having a wedge surface is slidably disposed between a side wall of the machine and the complementary surface which is on the other arm. Locking and adjusting means may secure said members to the slip plates with which they cooperate.

The walls of a feed hopper to the rollers may conveniently be carried on the slip plates.

If all the roller ends are not protected by slip plates, one or more rollers may have end flanges of a diameter sufficient to overlap the unprotected ends or portions of ends. In this case the flanges are preferably axially adjustable.

The invention will be described further by way of example with reference to the accompanying drawings, in which:

Fig. 1 is a diagrammatic sectional elevation of a dough rolling machine constructed in accordance with the invention, Fig. 2 is a diagrammatic end view corresponding to Fig. 1, Fig. 3 is a diagrammatic sectional elevation of an alternative form of construction, Fig. 4 is a diagrammatic sectional elevation of yet another form of construction, Fig. 5 is a detail sectional elevation of a flanged roller showing the means provided for axial adjustment.

Side walls 11, 11 of a dough rolling machine (Figs. 1 and 2) support the reduced diameter ends or spindles of three rollers 12, 13, 14, the axes of which are parallelly disposed so as to provide a dough compression space. Between the large diameter rolling portions and the spindle or reduced diameter end of each roller a clearance 15 will exist between the side walls 11, 11 and the end faces of the rollers or rolling portions. Slip plates 16 are adjustably secured to the top of the side walls 11 by bolts 28 and present a plain surface to the roller ends. Each of the opposite surfaces of the slip plates 16 to the afore-mentioned plain surfaces has a wedge surface thereon and complementary wedge pieces 17 are slidably disposed between this wedge surface and the side walls 11. The upper end of each wedge piece 17 has a stud 18 therein which passes through the upper portion of the corresponding slip plate 16, a nut 19 being threadedly engaged therewith in order to provide adjustment and locking means. Angle irons 20 secured to the slip plates 16 support the walls 21 of a hopper into which the dough 22 is fed to be subsequently guided to the compression space. The slip plates (Fig. 1) are shaped so as to guard the region of the roller peripheries at which the dough is contacted. If, for any reason, it is not practicable to extend this protection to all of the rollers 12, 13, 14 in a particular machine then adjustable end flanges 23 may be provided on one or more rollers for instance the lower roller 14 in order to protect adjacent portions of the peripheral region of the two upper rollers 12, 13. The flanges 23 (Fig. 5) are recessed so as to fit closely over the ends of the roller 14. Holes are provided in the roller ends and tapped so that threaded studs 24 may be screwed through. The studs protrude through corresponding holes in the end flanges 23. An externally threaded bush 25 fits over each stud 24 and is threadedly engageable in the holes in the end flanges 23 which are tapped to suit. Lock nuts 26, 27 are provided on the screwed bushes and on the outer end of the studs, respectively.

An alternative arrangement (Fig. 3) comprises three rollers 112, 113, 114 supported between side walls 111 in the manner previously described and fed by a hopper 121 supported on slip plates 116. The shape of the slip plates 116 is such as to provide the necessary protection to all the roller ends and thus end flanges are dispensed with.

In a further alternative construction (Fig. 4) a dough rolling machine may comprise four rollers 212, 213, 214a, 214b supported and fed with dough in the same manner as in the previous embodiments. The slip plates 216 in this case may be again shaped so as to provide all the necessary protection for the roller ends.

In operation (referring to Figs. 1 and 2 by way of example) the wedge members 17 are adjusted by means of the nuts 19 on the studs 18 while the bolts 28 holding the slip plates 16 onto the side walls 11 (which have a substantial clearance with the holes in the slip plates) are slackened just sufficiently to alow the slip plate 16 to move. The proximity of the plain surfaces of the slip plates 16 to the roller ends is adjusted so as to give a suitable small clearance or even to exert a small pressure on the roller ends. The bolts 28 securing the slip plates 16 to the side walls 11 are then tightened. If end flanges 23 are provided on any of the rollers, these may also be adjusted by means of the studs 24 and screw bushes 25. The lock nuts 26 provided on the screw bushes 25 are first slackened and the bushes 25 screwed into the end flanges 23 until the necessary clearance or pressure is obtained. The lock nuts 26 are then tightened and the second lock nuts 27 on the screwed studs 24 maintain the screw bushes 25 and end flanges 23 rigidly in position.

Dough 22 may be then fed into the hopper to be compressed in the compression space and subsequently rolled into a sheet 29 delivered finally on to a conveyor 30 beneath the machine. Three roll machines may be arranged to deliver one such sheet (Figs. 1 and 3) while a four roll machine may provide two sheets 231a, 231b, one to a lower conveyor 230 and one at an initially higher level (Fig. 4).

The construction is clearly such that the slip-plate assemblies may be quickly and easily dismantled to facilitate cleaning, maintenance and inspection.

I claim:

1. A dough moulding machine comprising in combination, side walls, rollers journalled in said side walls and having their ends spaced from said side walls, slip plates presenting on one side plane surfaces to said roller ends and wedge surfaces on their opposite sides, wedge members between said slip plates and said side walls having wedge surfaces cooperating with the wedge surfaces on said slip plates, and means to adjust said slip plates radially relatively to the axis of said rollers.

2. A dough moulding machine comprising in combination, side walls, rollers journalled in said side walls and having their ends spaced from said side walls, slip plates in the form of right-angular brackets, one of the arms of said brackets presenting plane surfaces to said roller ends on one side and wedge surfaces on their opposite side, means to secure the other arms of said right-angular brackets adjustably to said side walls, wedge members between the wedge surface arms of said brackets and said side walls, and screw means adjustably securing said wedge members slidably upon the arms of said brackets secured to said side walls.

3. A dough moulding machine comprising in combination, side walls, rollers journalled in said side walls and having their ends spaced from said side walls, slip plates having plane surfaces on one side and wedge surfaces on their opposite side, disposed between said roller ends and said side walls, means to adjust said slip plates radially of the axis of said rollers, and flanges on certain of said rollers of a diameter such as to overlap adjacent roller ends.

4. In a dough moulding machine, the combination of side walls, two rollers journalled at the same level in the upper part of said side walls, a further roller journalled centrally between said first two rollers and forming therewith a dough compression space, the periphery of said further roller touching the periphery of one of the first-mentioned rollers and spaced from the periphery of the other, two slip plates, one each side of the rollers, each comprising a right-angular bracket one arm of which is shaped to present a plane surface to the roller ends at least in the region in which the roller peripheries contact the dough while moulding it, and having wedge surfaces on their opposite sides, means to adjustably secure the other arm of said brackets to a side wall, a pair of wedge members each cooperating with a wedge surface on the respective slip plates and disposed between said slip plates and the side wall, means to adjustably mount said wedge members on the arm of the slip plates secured to the side wall, walls of a hopper for feeding dough to the rollers contacted by said slip plates, and a conveyor beneath said rollers to receive moulded dough.

JOSEPH FRANCIS NAYLOR.

REFERENCES CITED

The following references are of record in the file of this patent:

UNITED STATES PATENTS

| Number | Name | Date |
| --- | --- | --- |
| 1,538,179 | Dixon | May 19, 1925 |
| 1,876,712 | Maynard | Sept. 13, 1932 |
| 2,012,833 | Smith | Aug. 27, 1935 |